United States Patent Office 3,833,530
Patented Sept. 3, 1974

3,833,530
MORTAR COMPOSITION WITH VINYL CHLORIDE POLYMERIC ADHESION PROMOTING AGENT
Paul Wicht, Fribourg, and Kurt Volken, Basel, Switzerland, assignors to Linza Ltd., Basel, Switzerland
No Drawing. Original application Dec. 16, 1970, Ser. No. 98,912, now abandoned. Divided and this application May 4, 1972, Ser. No. 250,155
Claims priority, application Switzerland, Dec. 18, 1969, 18,799/69
Int. Cl. C04b 13/26; C08f 45/24
U.S. Cl. 260—29.6 S          3 Claims

ABSTRACT OF THE DISCLOSURE

A mortar composition containing a hydraulic binder and 5–50% by weight of an adhesion promoting agent for the mortar upon hardening comprising an aqueous dispersion prepared by polymerizing a monomer mixture of 30 to 80% by weight of vinyl chloride and 20 to 70% by weight of polymerisable, internally plasticising monomers in the presence of an aqueous phase which contains, referred to the total weight of the monomers.

(a) 3 to 6% by weight of an emulsifier mixture which consists of 60 to 90% by weight of non-ionic emulsifiers and 10 to 40% by weight of anionic emulsifiers,
(b) a polymerisation catalyst,
(c) 2 to 4% by weight of a water-soluble solvent for the polymer,
(d) 0.3 to 0.5% by weight of a copolymerisable, water-soluble monomer, and
(e) a buffer agent, and further adding 0.5 to 5% by weight, referred to the total dispersion, of an anionic emulsifier, and 0.1 to 0.5% by weight, referred to the total dispersion, of an antifoam agent to the dispersion thereby obtained.

---

This is a division of application Ser. No. 98,912, filed Dec. 16, 1970 now abandoned.

The invention relates to a process for the production of an alkali-resistant, finely disperse, aqueous plastics dispersion, based on a vinyl chloride copolymer with polymerisable, internally plasticising monomers, the glass temperature of the film formed therefrom being from 15 to 25° C., which dispersion is to be added to a mortar mixture to improve the adhesion of the hardened mortar.

It has previously been proposed to add aqueous polymer dispersions to concrete in order to improve its properties, such as tensile strength, flexural strength, and resistance to abrasion and crack formation. However, such dispersions should not produce any secondary effects, as for example prolongation of the hardening process, raising the water retention capacity, and the like. Useful results were obtained in particular with alkali-resistant dispersions based on copolymers of styrene/butadiene, acrylic acid esters and methacrylic acid esters, and vinyl chloride, with vinyl esters and acrylic esters, as well as with terpolymers of vinyl chloride, vinyl esters and ethylene (Dutch Patent Application 6807369), the vinyl chloride content varying between 5 and 40% by weight.

In the production of masonry, particularly in prefabricated parts, the weakest point is the bonding layer between the individual bricks. As a reesult of the poor adhesion of the masonry mortar (pointing mortar) to the bricks, damage occurs continually.

Of the plastics dispersions available at the present time which have been used as an additive to this masonry mortar, only copolymer dispersions based on vinylidene chloride and copolymer dispersions based on acrylic acid esters and methacrylic acid esters have produced satisfactory results.

The disadvantage of the use of dispersions based on vinylidene chloride is however that the vinylidene polymer is partly destroyed and forms not inconsiderable amounts of calcium chloride with constituents of mortar, which, if iron or steel reinforcements are present in the masonry, has a corrosive effect on these reinforcements and destroys them. On the other hand, dispersions based on acrylic acid esters or methacrylic acid esters are very expensive, with the result that their use as an additive to mortar is only worthwhile in very rare cases.

It is an object of the present invention to provide a plastics dispersion which, when used as an additive to mortar, improves its adhesiveness.

According to the invention, a process for the production of an alkali-resistant, finely disperse, aqueous plastics dispersion based on a vinyl chloride copolymer with polymerisable internally plasticising monomers, the glass temperature of the film formed therefrom being from 15 to 25° C., which dispersion is to be added to a mortar mixture to improve the adhesion of the hardened mortar, which includes the steps of polymerising a monomer mixture to 30 to 80% by weight of vinyl chloride and 20 to 70% by weight of polymerisable, internally plasticising monomers in the presence of an aqueous phase which contains, referred to the total weight of the monomers, (a) 3 to 6% by weight of an emulsifier mixture which consists of 60 to 90% by weight of non-ionic emulsifiers and 10 to 40% by weight of anionic emulsifiers,
(b) a polymerisation catalyst,
(c) 2 to 4% by weight of a water-soluble solvent for the polymer,
(d) 0.3 to 0.5% by weight of a copolymerisable, water-soluble ethylenically unsaturated monomer, and
(e) a buffer agent and further adding 0.5 to 5% by weight, referred to the total dispersion, of an anionic emulsifier, and 0.1 to 0.5% by weight, referred to the total dispersion, of an antifoam agent to the dispersion thereby obtained.

Alkyl esters of acrylic acid, for example butyl acrylate, ethylhexyl acrylate alkyl esters of; maleic acid and of itaconic acid; vinyl esters of saturated aliphatic monocarboxylic acids, for example vinyl acetate, vinyl propionate, vinyl laurate, vinyl ethylbutyrate, vinyl ethylhexanoate; and ethylene, are particularly suitable as internally plasticising monomers. Obviously, combinations of these monomers can also be used.

The amount of vinyl chloride to be used, which is between 30 and 80% by weight, depends on which further monomer components are used. In each case the composition must be chosen so that films are obtained which have a glass temperature of 15 to 25° C., preferably 15 to 20° C. If the second component is ethylene for example, the vinyl chloride proportion can amount up to 80%. If for example acrylic acid esters are used, the vinyl chloride proportion can amount up to 60%. A proportion of less than 30% of vinyl chloride has to be avoided, in order that the resistance to alkalis is retained.

The emulsifier mixture, which contains 20 to 40% of anionic emulsifiers and 60 to 80% of non-ionic emulsifiers is important. The ratio of anionic to non-anionic emulsifiers decisively influences the adhesiveness, and the necessary amount of water to be mixed with the mortar. If polymerizations is effected without anionic emulsifiers, the water/cement factor in the mortar rises very sharply with use. If polymerization is effected without non-ionic emulsifiers, the adhesiveness of the mortar is reduced. The subsequent modification of the dispersion by adding the anionic emulsifier to the finished polymerized dispersion is just as decisively important.

Anionic emulsifiers which are mainly used are alkyl, aryl and alkylaryl sulphonates, sulphuric acid esters of alcohols with 8 to 18 C-atoms, polyoxyethylated alkylphenol sulphonates, and polyoxyethylated alcohol sulphates.

Water-soluble solvents for the polymer which can be used are preferably polyol derivatives, for example, glycol butyl ether, butyl esters of glycolic acid, hexylene glycol, and so on.

The copolymerizable, water-soluble ethylenically unsaturated monomers are conveniently acrylic acid, methacrylic acid and sodium methallyl sulphonate.

Antifoaming agents which can be used advantageously are nonyl alcohol, silicone-containing compounds and polyethylene oxide derivatives.

The dispersions produced according to the invention are resistant to alkalis and have good adhesion properties. The average particle diameter of the synthetic resin particles is below 0.3 microns.

These dispersions are added to mortar mixtures to improve the adhesion of the hardened mortar, in amounts of 5 to 50% by weight referred to the hydraulic binder to the mortar (lime mortar, gypsum mortar, cement mortar). On account of the considerable improvement in the adhesion, bricks joined together by such a masonry mortar can also be produced as prefabricated masonry parts without the risk that the bricks will work loose from one another in transport.

In addition to this main area of use, the dispersions according to the invention can however also be used as binders for dispersion dyes and pigments.

In the following, Examples 1a, 2a, 3a and 4a are examples of the process according to the invention, Comparison Examples 1, 2, 3 and 4 which are not according to the invention show the importance of the supplementary addition of the anionic emulsifier to the same emulsifier and monomer composition in each case, and further Comparison Examples 5 to 8, not according to the invention, with another emulsifier and monomer composition with reference to the accompanying table.

EXAMPLES 1 AND 1a

The following aqueous phase was placed in a 2 litre capacity, stainless double jacket autoclave provided with a stirrer and a flow reservoir for the monomers:

570 g. of softened water, 15 g. of hexylene glycol (water-soluble solvent), 3 g. of acrylic acid polymerizable (water-soluble copolymerizable, ethylenically unsaturated monomer), 18 g. of non-ionic emulsifier (block polymer of propylene oxide/ethylene oxide with 80% of ethylene oxide), 3 g. of anionic emulsifier (sodium lauryl sulphate), 3 g. of secondary sodium phosphate (buffer), and 3 g. of potassium persulphate (catalyst).

The autoclave was sealed rinsed with nitrogen, and a monomer mixture consisting of 270 g. of vinyl chloride (VC), 210 g. of vinyl propionate (VP) and 120 g. of butylacrylate (BA), which additionally contained 12 g. of a block polymer of propylene oxide/ethylene oxide with 50% of ethylene oxide, as non-ionic emulsifier, was introduced by portions and polymerized at 68 to 70° C. The addition was complete after 3 to 4 hours. After a further 2 hours the autoclave was flushed with air and the pH-value was adjusted to 5.5 with sodium bicarbonate.

The dispersion obtained had the following properties:

Solids content: 53%
Particle size: <0.3 micron
VC content: 43%
Glass temperature of the film: 17° C.

0.5% by weight, referred to the total dispersion, of an antifoam agent based on silicone was added to the dispersion. In Example 1 the dispersion was used without further addition of an anionic emulsifier, and in Example 1a it was used after the addition of 3% by weight of an anionic emulsifier (Manox of Messrs. Hercules), referred to the total dispersion, for the production of a standard type mortar of the following composition:

|  | G. |
| --- | --- |
| Quartz sand, granulation 0 to 1 mm. | 648 |
| Quartz sand, granulation 1 to 4 mm. | 648 |
| Portland cement | 545 |
| Dispersion | 135 |

The plastics-cement factor was 0.125.

To determine the tensile strength, two bricks each having a mean specific absorptive capacity of 30 to 40 g./dm.$^2$, minute and over-all adhesion surface of 144 cm.$^2$, were cemented together crosswise with the above-mentioned mortar. The mortar joint was 6 mm. After storing for 8 days at 20° C. and a relative atmospheric humidity of 65%, the tensile strength of the bonding of the bricks was determined.

The values obtained are given in the table.

EXAMPLES 2 AND 2a

An aqueous phase of the following composition was placed in the autoclave mentioned in Examples 1 and 1a:

570 g. of softened water, 15 g. of glycol monobutyl ether (solvent), 3 g. of acrylic acid (water-soluble monomer), 4.5 g. of anionic emulsifier (sodium salt of diethyl sulphosuccinate), 12 g. of non-ionic emulsifier (block polymer of ethylene oxide/propylene oxide), 3 g. of sodium bicarbonate, 3 g. of secondary sodium phosphate and 3 g. of potassium persulphate.

A mixture of 300 g. of vinyl chloride (VC), 300 g. of vinyl propionate (VP) and 9 g. of a block polymer of ethylene oxide/propylene oxide as additional non-ionic emulsifier was polymerise at a maintained ethylene pressure of 20 atmospheres gauge in this aqueous phase.

The dispersion obtained had the following properties:

Solids content: 54 to 55%
Particle size: <0.3 micron
VC content: 41%
Glass temperature of the film: 19° C.

This dispersion was further worked up and tested as in Examples 1 and 1a.

EXAMPLES 3 AND 3a

A dispersion was polymerised as in Examples 1 and 1a. The aqueous phase had the following composition:

570 g. of softened water, 15 g. of a polyglycol derivative (solvent), 3 g. of acrylic acid, 15 g. of non-ionic emulsifier (block polymer of ethylene oxide/propylene oxide with 80% of ethylene oxide). 3 g. of anionic emulsifier (sodium lauryl sulphate), 3 g. of sodium bicarbide, 2 g. of secondary sodium phosphate and 3 g. of potassium persulphate.

The monomer mixture of 210 g. of vinyl chloride (VC), 150 g. of vinyl acetate (VA) and 240 g. of butyl acrylate (BA) additionally contained 6 g. of a block polymer of ethylene oxide/propylene oxide as non-ionic emulsifier.

The following dispersion was produced:

Solids content: 53%
Particle size: <0.3 micron
VC content: 33%
Glass temperature of the film: 15° C.

This dispersion was further worked up and tested as in Examples 1 and 1a.

EXAMPLE 5

As a comparison Example 3 was followed, with the difference that 12 g. of an ammonium salt of a sulphate ester of an alkylphenoxy-polyoxy-ethylene-ethanol (anionic emulsifier) and 9 g. of a block polymer of ethylene oxide/propylene oxide (non-ionic emulsifier) was used in the aqueous phase as *emulsifier*. The monomer mixture contained in addition 6 g. of non-ionic emulsifier.

The dispersion had the following properties:

Solids content: 52%
Particle size: <0.3 micron
VC content: 31%
Glass temperature of the film: 16° C.

As the table shows, the tenacity of the bonding produced with mortar containing this dispersion was only 0.5 kg./cm.$^2$. A supplementary addition of anionic emulsifiers was superfluous, since the tensile strength could not be substantially raised by this means.

tensile strength values were then only 1 kg./cm.$^2$, as shown in the table.

The total composition of the emulsifiers is given in the table, i.e. also the emulsifiers which are channeled together with the monomers are contained in the "emulsifier composition" column. Each dispersion contained 0.5% of an antifoam agent.

| Example | Emulsifier composition (percent) | | Monomer composition | Extra addition of emulsifier | Water-cement factor | Tensile strength |
|---|---|---|---|---|---|---|
| | Nonionic | Anionic | | | | |
| 1 | 90 | 10 | Vinyl chloride, 270 g. / Vinyl propionate, 210 g. / Butyl acrylate, 120 g. | | 0.380 | 6.0 |
| 1a | 90 | 10 | As Example 1 | 3% of anionic emulsifier | 0.321 | 9.7 |
| 2 | 82.5 | 17.5 | Vinyl chloride, 300 g. / Vinyl propionate, 300 g. / Ethylene at 20 atoms gauge pressure | | 0.322 / 0.322 | 5.5 / 5.5 |
| 2a | 82.5 | 17.5 | As Example 2 | 3% of anionic emulsifier | 0.301 | 9.5 |
| 3 | 87.5 | 12.5 | Vinyl chloride, 210 g. / Vinyl acetate, 150 g. / Butyl acrylate, 240 g. | | 0.397 | 5.9 |
| 3a | 87.5 | 12.5 | As Example 3 | 2% of anionic emulsifier | 0.301 | 8.6 |
| 4 | 87.5 | 12.5 | Vinyl chloride, 210 g. / Vinyl acetate, 150 g. / Dibutyl maleate, 240 g. | | 0.440 | 4.0 |
| 4a | 87.5 | 12.5 | As Example 4 | 4% of anionic emulsifier | 0.320 | 10.0 |
| 5 | 55.5 | 44.5 | As Example 3 | | 0.504 | 0.5 |
| 6 | 87.5 | 12.5 | As Example 3, but without solvent in the aqueous phase | | 0.489 | 1.0 |
| 7 | 87.5 | 12.5 | Vinyl chloride, 270 g. / Vinyl acetate, 210 g. / Butyl acrylate, 120 g. Glass temperature 29° C. | | 0.489 | 1.0 |
| 8 | 90 | 10 | As Example 1 | 3% of non-ionic emulsifier | 0.381 | 1.0 |

EXAMPLE 6

A dispersion was produced as in Example 3, but *without* the addition of *solvent* to the aqueous phase.

The dispersion had the following properties:

Solids content: 52%
Particle size: 0.4 to 0.8 micron
VC content: 31%
Glass temperature of the film: 19° C.

The tenacity of the bonding of the bricks produced using mortar with this dispersion was only about 1 kg./cm.$^2$.

In this case also, an addition of anionic emulsifier to the dispersion brought no substantial improvement.

EXAMPLE 7

A dispersion was produced as in Example 3, with the difference that the monomer composition was chosen so that the glass temperature was 29° C., that is, outside the range according to the invention. The solids content was 52.5%, the particle size was below 0.3 micron, and the VC content was 42.5%. In this case also the above-defined tenacity was very low (1.0 kg./cm.$^2$).

EXAMPLE 8

In order to show that the extra addition of anionic emulsifiers is an essential feature of the invention, in this Example 3% of a non-ionic emulsifier was added to the dispersion according to Example 2. The above-defined tensile strength values were then only 1 kg./cm.$^2$, as shown in the table.

We claim:

1. A mortar composition consisting essentially of a hydraulic binder and 5–50% by weight based on the weight of the hydraulic binder selected from the group consisting of lime, mortar, gypsum and cement of an adhesion promoting agent for the mortar upon hardening consisting essentially of an aqueous dispersion prepared by polymerizing a monomer mixture of 30 to 80% by weight of vinyl chloride and 20 to 70% by weight of a polymerizable, internally plasticizing monomer selected from the group consisting of alkyl esters of acrylic acid, maleic acid, itaconic acid, vinyl esters of saturated aliphatic monocarboxylic acids, ethylene and mixtures thereof in the presence of an aqueous phase consisting essentially of, referred to the total weight of the monomers.

(a) 3 to 6% by weight of an emulsifier mixture which consists of 60 to 90% by weight of nonionic emulsifiers and 10 to 40% by weight of anionic emulsifiers, (b) a free radical polymerization catalyst, (c) 2 to 4% by weight of a water-soluble solvent for the polymer, (d) 0.3 to 0.5% by weight of a copolymerizable, water-soluble ethylenically unsaturated monomer, and (e) a pH buffer agent and thereafter adding 0.5 to 5% by weight, referred to the total dispersion, of an anionic emulsifier, and 0.1 to 0.5% by weight, referred to the total dispersion, of an antifoam agent to the dispersion thereby obtained, the glass temperature of a film formed from said dispersion being from 15 to 25° C.

2. The mortar composition of claim 1 wherein said copolymerizable, water soluble monomer is selected from the group consisting of acrylic acid, methacrylic acid and mixtures thereof.

3. The mortar composition of claim 1 wherein said hydraulic binder is portland cement.

References Cited

UNITED STATES PATENTS

| | | | |
|---|---|---|---|
| 2,868,753 | 1/1959 | Morgan et al. | 260—29.6 S |
| 2,962,458 | 11/1960 | Bird et al. | 260—29.6 S |
| 2,990,382 | 6/1961 | Wagner et al. | 260—29.6 S |
| 2,962,465 | 11/1960 | Lindstrom et al. | 260—29.6 TA |
| 3,202,638 | 8/1965 | Von Ess | 260—78.5 R |
| 3,297,618 | 1/1967 | Glabisch | 260—29.6 TA |
| 3,370,031 | 2/1968 | Grommers et al. | 260—29.6 TA |

FOREIGN PATENTS

| | | |
|---|---|---|
| 609,934 | 5/1962 | Belgium. |
| 748,479 | 12/1966 | Canada. |
| 1,178,597 | 9/1964 | Germany. |

OTHER REFERENCES

Ley et al., Journal of Polymer Science, Part A, 2, 1863–67 (1964).

HAROLD D. ANDERSON, Primary Examiner

U.S. Cl. X.R.

260—29.6 T

UNITED STATES PATENT OFFICE
CERTIFICATE OF CORRECTION

Patent No. 3,833,530  Dated Sept. 3, 1974

Inventor(s) Paul Wicht and Kurt Volken

It is certified that error appears in the above-identified patent and that said Letters Patent are hereby corrected as shown below:

In the Heading of the Patent:

Column 1, line 5, change the name of the Assignee from "LINZA LTD." to --LONZA LTD.--.

Signed and sealed this 18th day of February 1975.

(SEAL)
Attest:

RUTH C. MASON
Attesting Officer

C. MARSHALL DANN
Commissioner of Patents
and Trademarks